US012808709B2

(12) United States Patent
Okazaki et al.

(10) Patent No.: US 12,808,709 B2
(45) Date of Patent: Nov. 24, 2026

(54) MEASUREMENT APPARATUS AND STORAGE MEDIUM

(71) Applicant: OMRON HEALTHCARE CO., LTD., Muko (JP)

(72) Inventors: Tetsuzo Okazaki, Kyoto (JP); Nobuo Kubo, Kyoto (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 251 days.

(21) Appl. No.: 18/591,986

(22) Filed: Feb. 29, 2024

(65) Prior Publication Data

US 2024/0201006 A1 Jun. 20, 2024

Related U.S. Application Data

(63) Continuation of application No. PCT/JP2023/004205, filed on Feb. 8, 2023.

(30) Foreign Application Priority Data

Jul. 22, 2022 (JP) ................................ 2022-117159

(51) Int. Cl.
*G01G 19/44* (2006.01)
*G01G 23/37* (2006.01)
(Continued)

(52) U.S. Cl.
CPC ......... *G01G 19/44* (2013.01); *G01G 23/3735* (2013.01); *H04W 4/38* (2018.02); *H04W 4/80* (2018.02); *H04W 52/02* (2013.01)

(58) Field of Classification Search
CPC ............... G01G 19/44; G01G 23/3728; G01G 23/3735; H04W 4/38; H04W 4/80; H04W 52/02
See application file for complete search history.

(56) References Cited

U.S. PATENT DOCUMENTS 4,396,080 A * 8/1983 Dee .......................... G01G 3/14 177/1
4,553,618 A * 11/1985 Kusmenskji ............. G01G 7/02 177/185
(Continued)

FOREIGN PATENT DOCUMENTS

JP 2014096763 A 5/2014
JP 2015-159978 A 9/2015
(Continued)

OTHER PUBLICATIONS

Computer translation of JP 2019030596 downloaded from the JPO website (Year: 2026).*
(Continued)

*Primary Examiner* — Randy W Gibson
(74) *Attorney, Agent, or Firm* — Keating & Bennett, LLP

(57) ABSTRACT

A non-wearable measurement apparatus includes: a wireless communication interface configured to execute wireless communication with an information terminal; a sensor configured to detect a change in a surrounding environment when the measurement apparatus is not in use; and a controller configured to, in response to the sensor detecting the change in the surrounding environment, cause the wireless communication interface to transmit an advertisement signal for the wireless communication before use of the measurement apparatus.

9 Claims, 8 Drawing Sheets

(51) Int. Cl.

| | |
|---|---|
| ***H04W 4/38*** | (2018.01) |
| ***H04W 4/80*** | (2018.01) |
| ***H04W 52/02*** | (2009.01) |

(56) References Cited

U.S. PATENT DOCUMENTS

| | | | | |
|---|---|---|---|---|
| 5,207,284 | A * | 5/1993 | Douglas | G01G 21/283 177/180 |
| 5,254,992 | A * | 10/1993 | Keen | G01D 3/0365 341/126 |
| 10,390,772 | B1 * | 8/2019 | Kovacs | A61B 5/0205 |
| 10,705,607 | B2 | 7/2020 | Sato | |
| 2003/0163287 | A1 * | 8/2003 | Vock | A61B 5/1112 702/187 |
| 2004/0229575 | A1 * | 11/2004 | Chan | G01G 19/44 455/90.3 |
| 2011/0240379 | A1 * | 10/2011 | Forshaw | G01G 19/44 177/1 |
| 2014/0272049 | A1 * | 9/2014 | Azzano | A47J 31/4403 426/433 |
| 2018/0109852 | A1 | 4/2018 | Mandapaka et al. | |
| 2018/0110077 | A1 | 4/2018 | Mandapaka et al. | |
| 2018/0110078 | A1 | 4/2018 | Mandapaka et al. | |
| 2018/0115546 | A1 | 4/2018 | Ito et al. | |
| 2019/0018621 | A1 | 1/2019 | Akahira | |
| 2020/0107755 | A1 | 4/2020 | Kubo et al. | |
| 2021/0212132 | A1 | 7/2021 | Mandapaka et al. | |
| 2022/0086923 | A1 | 3/2022 | Mandapaka et al. | |
| 2023/0089907 | A1 | 3/2023 | Mandapaka et al. | |
| 2024/0125665 | A1 * | 4/2024 | Zhang | B60C 23/0479 |

FOREIGN PATENT DOCUMENTS

| | | | |
|---|---|---|---|
| JP | 2017-101986 | A | 6/2017 |
| JP | 2018-074205 | A | 5/2018 |
| JP | 2019-018371 | A | 2/2019 |
| JP | 2019030596 | A | 2/2019 |
| JP | 2022-058553 | A | 4/2022 |

OTHER PUBLICATIONS

Official Communication issued in International Patent Application No. PCT/JP2023/004205, mailed on Apr. 4, 2023.

Official Communication issued in corresponding Indian Patent Application No. 202417014954, mailed on Feb. 20, 2026, 7 pages.

* cited by examiner

MEASUREMENT APPARATUS AND STORAGE MEDIUM

CROSS-REFERENCE TO RELATED APPLICATIONS

This application is a continuation of PCT application No. PCT/JP2023/004205, which was filed on Feb. 8, 2023 based on Japanese Patent Application No. 2022-117159 filed on Jul. 22, 2022, the contents of which are incorporated herein by way of reference.

BACKGROUND

The present invention relates to a measurement apparatus and a storage medium storing a control program.

In the related art, there has been known a wearable system including a wearable communication device and an information acquisition device (an optional device), in which the communication device acquires biological information of a user detected by the information acquisition device using a wireless communication function such as Bluetooth (registered trademark) (JP2017-101986A).

When acquired information is transmitted and received between a communication device and an information acquisition device using a wireless communication function, it is a problem to reduce power consumption associated with an advertising operation of the information acquisition device and a scanning operation of the communication device. According to the wearable system in JP2017-101986A, when transmitting and receiving biological information, the communication device causes an LED to emit light and starts the scanning operation when a wireless connection switch of the communication device is pressed. When receiving the light emission, the information acquisition device starts the advertising operation. Accordingly, the advertising period and the scanning period may be reduced to reduce power consumption.

However, the reduction of power consumption in JP2017-101986A is conditional on the pressing operation of the wireless connection switch performed by the user on the communication device side. JP2017-101986A does not disclose the reduction of power consumption in consideration of convenience of the operation performed by the user.

The wearable system in JP2017-101986A is intended for the wearable communication device, and there is room for improvement in regard to user convenience and reduction of power consumption in regard to a non-wearable measurement apparatus such as a weight scale, a body composition meter, and a blood pressure monitor.

Aspects of the present disclosure relate to providing a measurement apparatus and a storage medium storing a control program thereof that are capable of improving user convenience and reducing power consumption.

SUMMARY

According to an aspect of the present disclosure, there is provided a non-wearable measurement apparatus including:

- a wireless communication interface configured to execute wireless communication with an information terminal;
- a sensor configured to detect a change in a surrounding environment when the measurement apparatus is not in use; and
- a controller configured to, in response to the sensor detecting the change in the surrounding environment, cause the wireless communication interface to transmit an advertisement signal for the wireless communication before use of the measurement apparatus.

DESCRIPTION OF EMBODIMENTS

Hereinafter, an embodiment according to an aspect of the present disclosure will be described with reference to the drawings.

§ 1 Application Example

<Information Management System 100>

Figure 1:
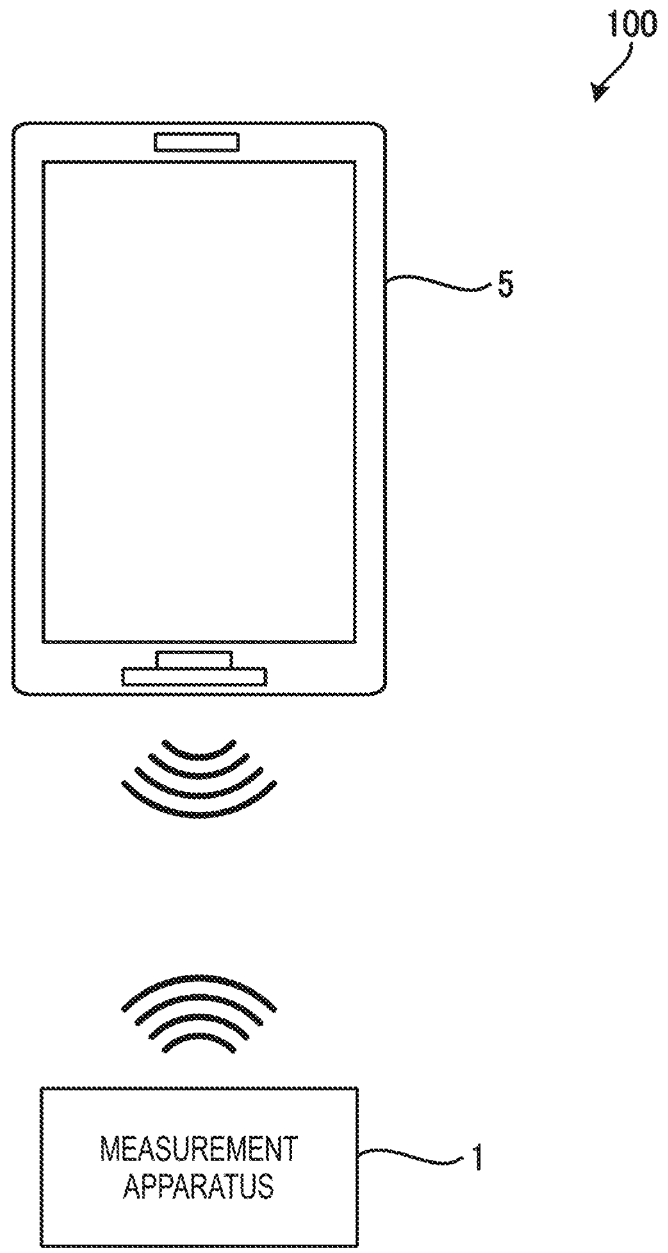
FIG. 1 is a diagram showing an information management system including a measurement apparatus according to the present disclosure and an information terminal that executes wireless communication with the measurement apparatus.

FIG. 1 shows an information management system 100 including a measurement apparatus 1 according to an embodiment of the present disclosure and an information terminal 5 that executes wireless communication with the measurement apparatus 1.

The measurement apparatus 1 includes a biological information measurement apparatus that measures biological information such as the body weight, the body composition, the blood pressure, the pulse, the heart rate, the body temperature, the blood sugar, or the blood oxygen saturation. The measurement apparatus 1 includes a measurement sensor that measures the amount to be measured. The amount to be measured by the measurement sensor includes biological information such as the body weight, the body fat percentage, the blood pressure value, the pulse rate, the heart rate, the body temperature, the blood sugar level, or the blood oxygen saturation level depending on the measurement apparatus 1. The measurement apparatus 1 is a non-wearable measurement apparatus. The non-wearable measurement apparatus is a measurement apparatus that is not wearable. The wearable measurement apparatus is a measurement apparatus (for example, an activity amount meter) carried by being worn on the body of the user. For example, the measurement apparatus 1 (the non-wearable measurement apparatus) is a measurement apparatus such as a body weight meter, a body composition meter, a body weight and body composition meter, or a blood pressure monitor, which is used in the state of being provided on the ground or on the stand. The measurement apparatus 1 transmits the measured biological information as management measurement information of the user to the information terminal 5 by wireless communication.

The information terminal 5 stores the management measurement information received from the measurement apparatus 1 in a data storage unit in the information terminal 5. The information terminal 5 may execute wireless communication with a device other than the measurement apparatus 1, and stores information acquired from an external device in the data storage unit in the information terminal 5. The information terminal 5 is an information processing device that analyzes various types of information acquired from the measurement apparatus 1 and other external devices. The information terminal 5 is a terminal including a display such as a smartphone, a tablet terminal, a notebook computer, a desktop computer, or a wearable terminal. The information terminal 5 may be set to acquire the management measurement information from the specific measurement apparatus 1. The specific measurement apparatus 1 that acquires the management measurement information may be registered in advance in the data storage unit of the information terminal 5.

Figure 2:
FIG. 2 is a diagram showing the measurement state when the user measures the body weight and the body composition using a body weight and body composition meter as an example of the measurement apparatus.

FIG. 2 is a diagram showing the measurement state when a user W measures the body weight and the body composition using a body weight and body composition meter 1A as an example of the measurement apparatus 1. The body weight and body composition meter 1A is an example of a biological information measurement apparatus, measures the body weight and the body composition of the user W, outputs the measurement result to the user W, and transmits the measurement result as the management measurement information of the user W to the information terminal 5 by wireless communication.

Figure 3:
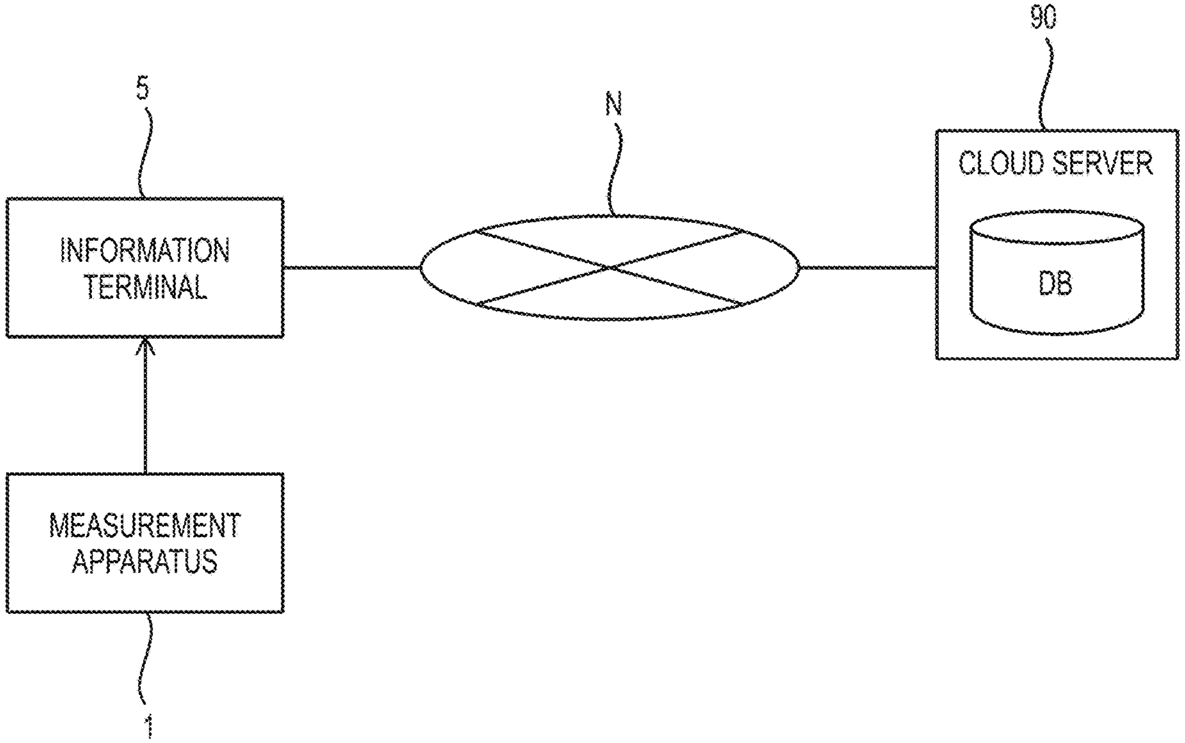
FIG. 3 is a diagram showing an example in which an information terminal is connected to a network.

FIG. 3 is a diagram showing an example in which the information terminal 5 is connected to a network. As shown in FIG. 3, the information terminal 5 may be connected to a cloud server 90 via a wide area network N such as the Internet. The information terminal 5 may transmit the management measurement information stored therein to the cloud server 90 via the wide area network N and manage the management measurement information of the user W as a database in the cloud server 90. The information terminal 5 may acquire the management measurement information managed in the cloud server 90 via the wide area network N and use the acquired management measurement information.

§ 2 Configuration Example

<Configuration of Measurement Apparatus 1>

Figure 4:
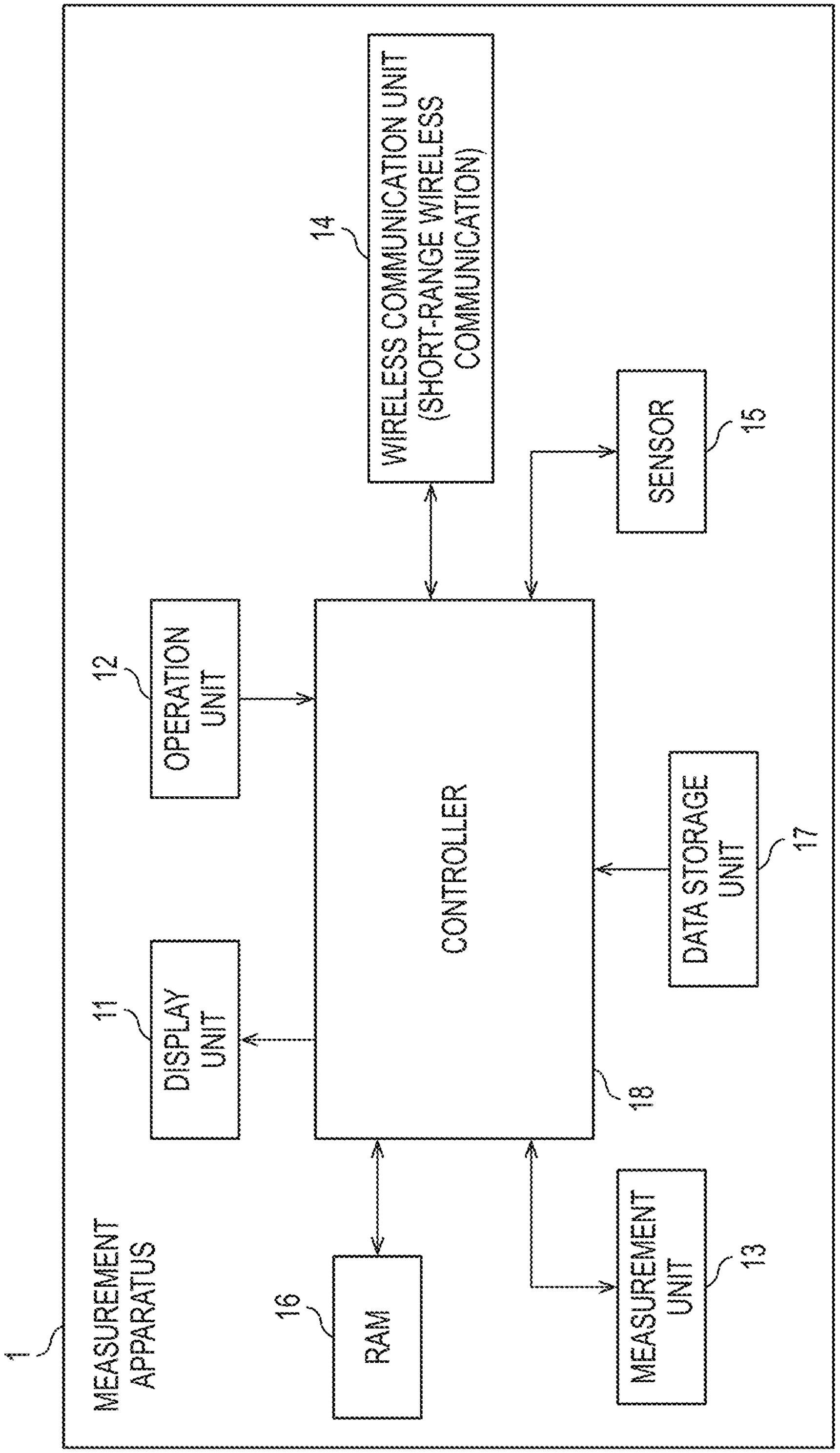
FIG. 4 is a block diagram showing the configuration of the measurement apparatus.

FIG. 4 is a block diagram showing the configuration of the measurement apparatus 1. The measurement apparatus 1 includes a display unit 11 that displays various types of information, an operation unit 12 operated by the user, a measurement unit 13 that measures biological information and the like, a wireless communication unit 14 that executes communication with an external device, and a sensor 15 that detects a change in a surrounding environment. The measurement apparatus 1 also includes a RAM 16 that temporarily stores information, a data storage unit 17 that stores information and programs, and a controller 18 that controls the overall operation. The controller 18 is an example of a controller and a processor according to the present disclosure.

The display unit 11 includes, for example, a liquid crystal display or an organic electro luminescence (EL) display. The operation unit 12 is a user interface such as a button or a touch panel that receives the user operation. The buttons include a button physically provided in the measurement apparatus 1 and a virtual button displayed on the display unit 11.

The measurement unit 13 measures the biological information such as the body weight, the body composition, the blood pressure, the pulse, the heart rate, the body temperature, the blood sugar, or the blood oxygen saturation. What to measure differs depending on the object to be measured by the measurement apparatus 1.

The wireless communication unit 14 is a communication unit that executes short-range wireless communication, for example, a circuit (a module) that executes communication according to the Bluetooth Low Energy (BLE (registered trademark)) standard. The wireless communication unit 14 transmits an advertisement signal for executing wireless communication to an unspecified number of external devices by broadcast communication at a predetermined transmission cycle. The wireless communication unit 14 transmits the advertisement signal including, for example, the name and the attribute information of the measurement apparatus 1. The BLE communication executed by the wireless communication unit 14 is, for example, communication using 2.4 GHz frequency. The wireless communication unit 14 transmits the management measurement information such as biological information measured by the measurement unit 13 to the information terminal 5 by the BLE communication.

Examples of the sensor 15 include an acceleration sensor and a human sensor. The human sensor is, for example, an infrared ray sensor, an ultrasonic sensor, a sound sensor, or an ultra wide band (UWB) radar. The acceleration sensor is a sensor capable of detecting a change in the surrounding environment based on surrounding vibration, own acceleration, and the like. The own acceleration is, for example, the acceleration when the acceleration sensor is moved.

Examples of the sensor 15 include a sensor that measures the radio field intensity in predetermined wireless communication. The predetermined wireless communication is wireless communication different from the wireless communication (the BLE communication) executed between the measurement apparatus 1 and the information terminal 5, for example, wireless communication (wireless local area network (LAN)) executed between the access point of the wireless LAN in the user home in which the measurement apparatus 1 is placed and the information terminal 5 carried by the user. The wireless LAN is, for example, Wireless Fidelity (Wi-Fi: registered trademark). Wi-Fi communication executed between the access point of the wireless LAN and the information terminal 5 is communication using 2.4 GHz frequency. Therefore, the measurement apparatus 1 may measure the radio field intensity of the Wi-Fi communication by the BLE circuit in the wireless communication unit 14. The BLE circuit operates as a sensor that measures the radio field intensity in the predetermined wireless communication.

The sensor 15 detects a change in the surrounding environment, for example, when the main power supply of the measurement apparatus 1 is turned OFF (in the power-saving standby state), that is, when the measurement apparatus 1 is not used for measurement. The sensor 15 detects a change in the surrounding environment associated with movement (approach of the user) of the user based on a change in the relative positional relationship between the user and the measurement apparatus 1. The BLE circuit operating as a sensor detects a change in the surrounding environment as the user moves (when the user returns home)

based on a change in the radio field intensity of the Wi-Fi communication executed between the access point of the wireless LAN and the information terminal 5.

The RAM 16 includes, for example, a semiconductor device such as a DRAM or an SRAM, temporarily stores information, and serves as a work area of the controller 18.

The data storage unit 17 is a recording medium that stores parameters, a control program, management measurement information, and the like necessary for implementing predetermined processing. The data storage unit 17 includes, for example, a hard disk drive (HDD) or a semiconductor storage device (SSD).

The controller 18 implements the predetermined processing by executing a control program. In the present embodiment, for example, health management application software for the measurement apparatus is installed in advance as a control program in the data storage unit 17, and the controller 18 implements the predetermined processing by executing the health management application software.

For example, when the sensor 15 detects a change in the surrounding environment, the controller 18 controls the wireless communication unit 14 to transmit an advertisement signal for the wireless communication (the BLE communication). Specifically, when the controller 18 detects the approach of the user to the measurement apparatus 1 based on a change in the surrounding environment, the controller 18 controls the wireless communication unit 14 to transmit the advertisement signal. The change in the surrounding environment is a change related to the movement of the user. When the change in the surrounding environment is detected, the controller 18 executes control to transmit an advertisement signal before using the measurement apparatus 1, that is, before measuring the management measurement information of the user.

<Configuration of Information Terminal 5>

Figure 5:
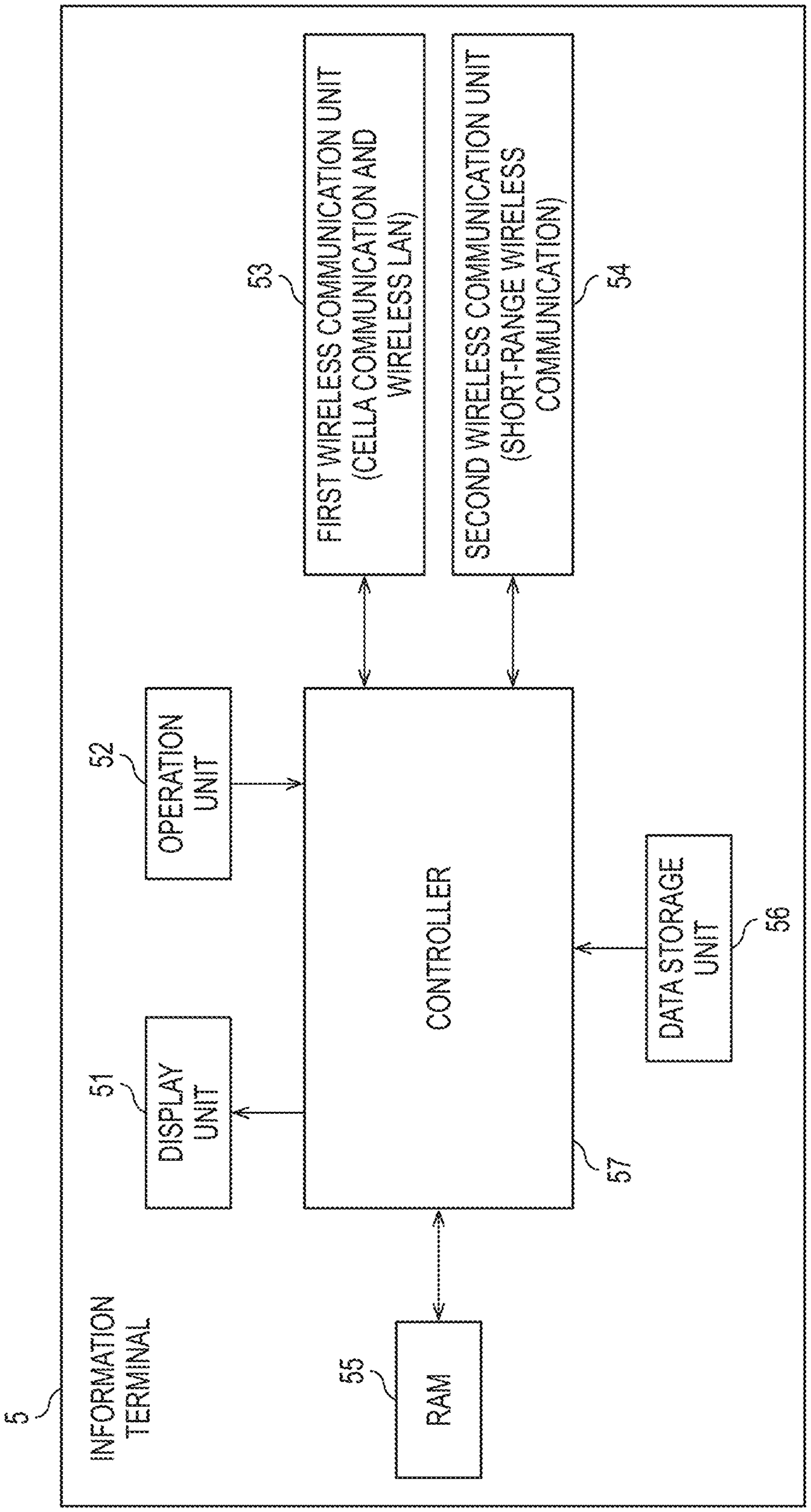
FIG. 5 is a block diagram showing the configuration of the information terminal.

FIG. 5 is a block diagram showing the configuration of the information terminal 5. The information terminal 5 includes a display unit 51 that displays various types of information, an operation unit 52 operated by the user, and a first wireless communication unit 53 and a second wireless communication unit 54 that execute communication with an external device. The information terminal 5 includes a RAM 55 that temporarily stores information, a data storage unit 56 that stores information and a program, and a controller 57 that controls the entire operation.

The display unit 51 includes, for example, a liquid crystal display or an organic EL display. The operation unit 52 is a user interface such as a button or a touch panel that receives the user operation. The buttons include a button physically provided on the information terminal 5 and a virtual button displayed on the display unit 51.

The first wireless communication unit 53 is a communication unit that executes cellular communication, for example, a circuit (a module) that executes communication according to standards such as 4G, 5G, and Long Term Evolution (LTE: registered trademark). The first wireless communication unit 53 is a communication unit that executes the wireless LAN communication, for example, a circuit (a module) that executes communication according to a standard such as Wi-Fi. The second wireless communication unit 54 is a communication unit that executes short-range wireless communication, for example, a circuit (a module) that executes communication according to the BLE standard.

For example, the second wireless communication unit 54 executes the BLE communication with the wireless communication unit 14 of the measurement apparatus 1 to acquire the management measurement information of the user measured by the measurement apparatus 1. By executing scanning, the second wireless communication unit 54 receives the advertisement signal transmitted from the wireless communication unit 14 of the measurement apparatus 1. The second wireless communication unit 54 recognizes the measurement apparatus 1 based on the received advertisement signal, and transmits a connection request to the measurement apparatus 1 when communication connection is desired. The measurement apparatus 1 waits for the connection request for the predetermined time after transmitting the advertisement signal, and when receiving the connection request within the predetermined time, stops transmitting the advertisement signal and switches to one-to-one connection communication with the connection request partner.

The RAM 55 includes, for example, a semiconductor device such as a DRAM or an SRAM, temporarily stores information, and serves as a work area of the controller 57.

The data storage unit 56 is a recording medium that stores parameters, a control program, management measurement information acquired from the measurement apparatus 1, and the like necessary for implementing predetermined processing. The data storage unit 56 includes, for example, a hard disk drive (HDD) or a semiconductor storage device (SSD).

The controller 57 implements the predetermined processing by executing a control program. In the present embodiment, for example, health management application software for an information terminal is installed in advance as a control program in the data storage unit 56, and the controller 57 implements the predetermined processing by executing the health management application software. For example, when the health management application software for an information terminal is started, the controller 57 controls the second wireless communication unit 54 to receive an advertisement signal by executing scanning. When the advertisement signal from the measurement apparatus 1 is received, the controller 57 transmits a connection request to the measurement apparatus 1 and controls the second wireless communication unit 54 to acquire the management measurement information from the measurement apparatus 1.

§ 3 Operation Example

<Operation of Measurement Apparatus 1>

Figure 6:
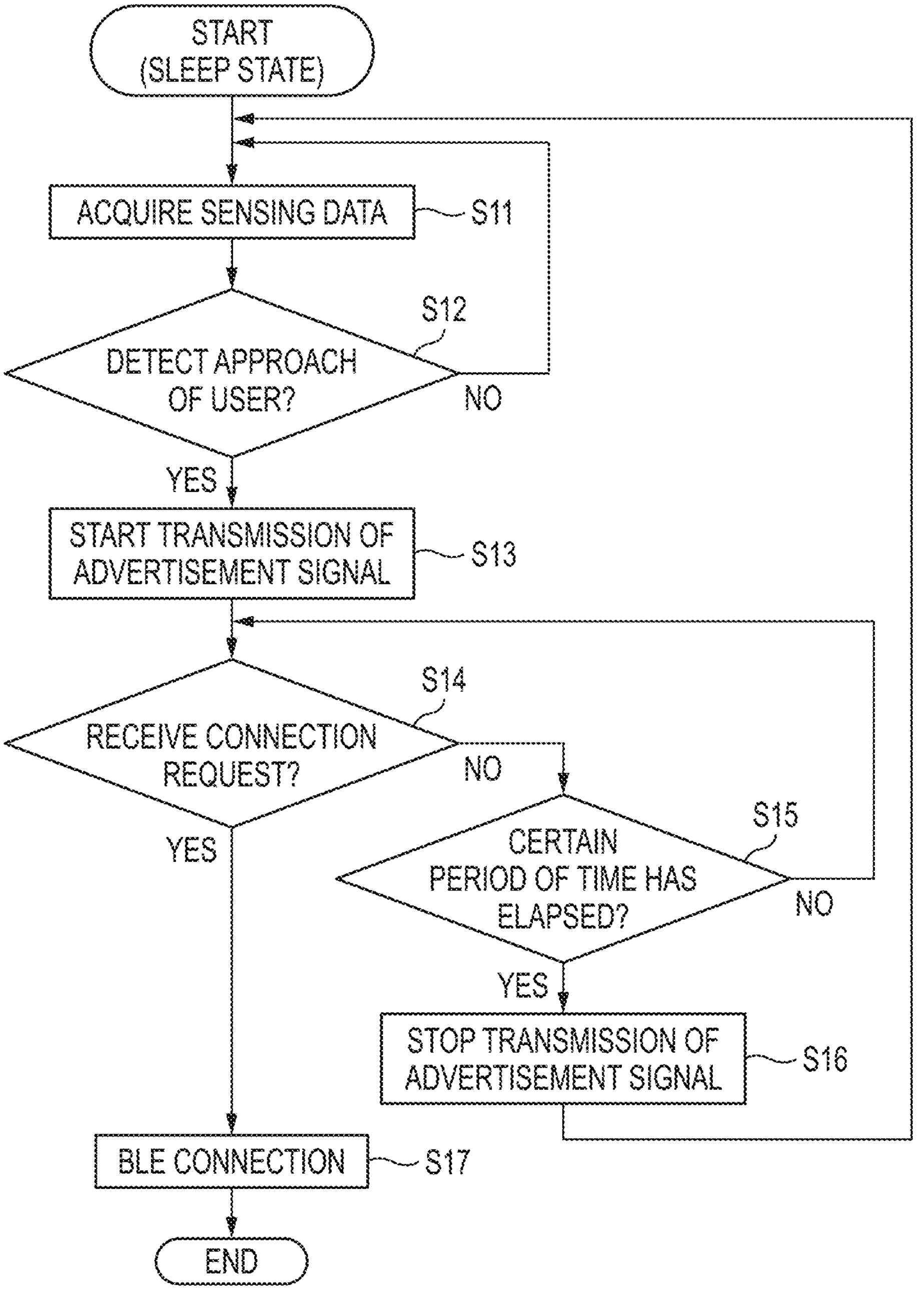
FIG. 6 is a flowchart showing a processing procedure of a controller in the sleep state of the measurement apparatus.

Next, an operation example of the measurement apparatus 1 will be described with reference to FIGS. 6 to 8. FIG. 6 is a flowchart showing a processing procedure of the controller 18 when the measurement apparatus 1 is unused (in the sleep state). This processing is started when the operation state of the measurement apparatus 1 shifts to the sleep state.

The controller 18 of the measurement apparatus 1 acquires, from the sensor 15, the sensing data collected by the sensor 15 (step S11).

The controller 18 determines whether approach of the user to the measurement apparatus 1 is detected based on the sensing data acquired by the sensor 15 (step S12). Examples of the approach of the user to the measurement apparatus 1 include the case shown in FIG. 7 or FIG. 8.

Figure 7:
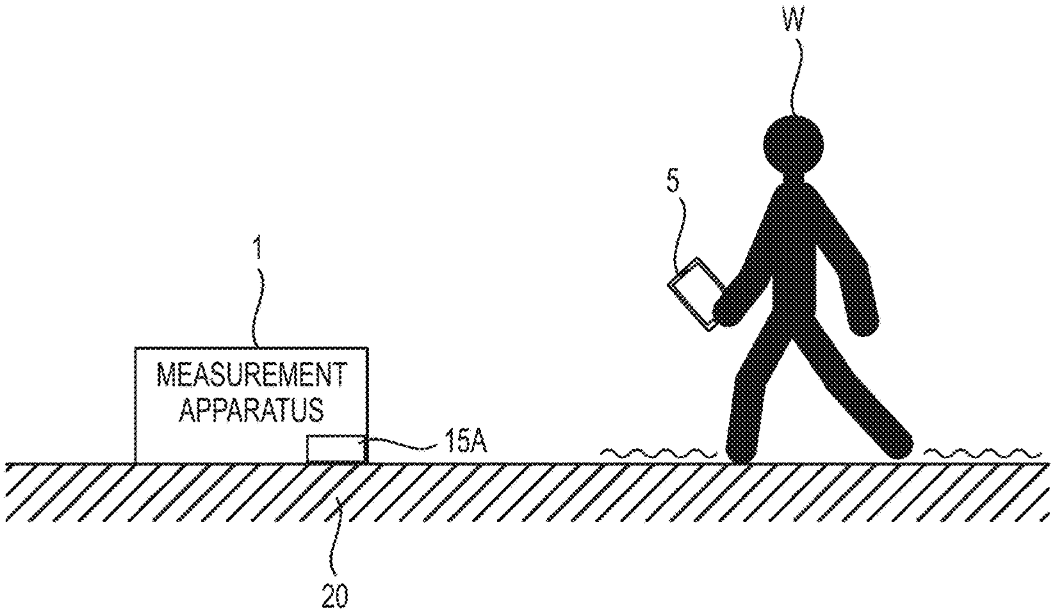
FIG. 7 is a diagram showing an example of measuring vibration caused by movement of a user and detecting approach of the user.

FIG. 7 is a diagram showing an example of detecting the approach of the user W by collecting vibration data of a floor 20 accompanying the movement of the user W using an acceleration sensor 15A mounted on the measurement apparatus 1. The acceleration sensor 15A is a sensor provided in the sensor 15 shown in FIG. 4. For example, the acceleration sensor 15A determines that the user W is approaching when the vibration data of a predetermined value or more is detected or when the value of the vibration data gradually increases. The user W shown in the drawing carries the information terminal 5. Alternatively, the user W may not carry the information terminal 5. For example, the information terminal 5 may be placed at a nearby location.

Figure 8:
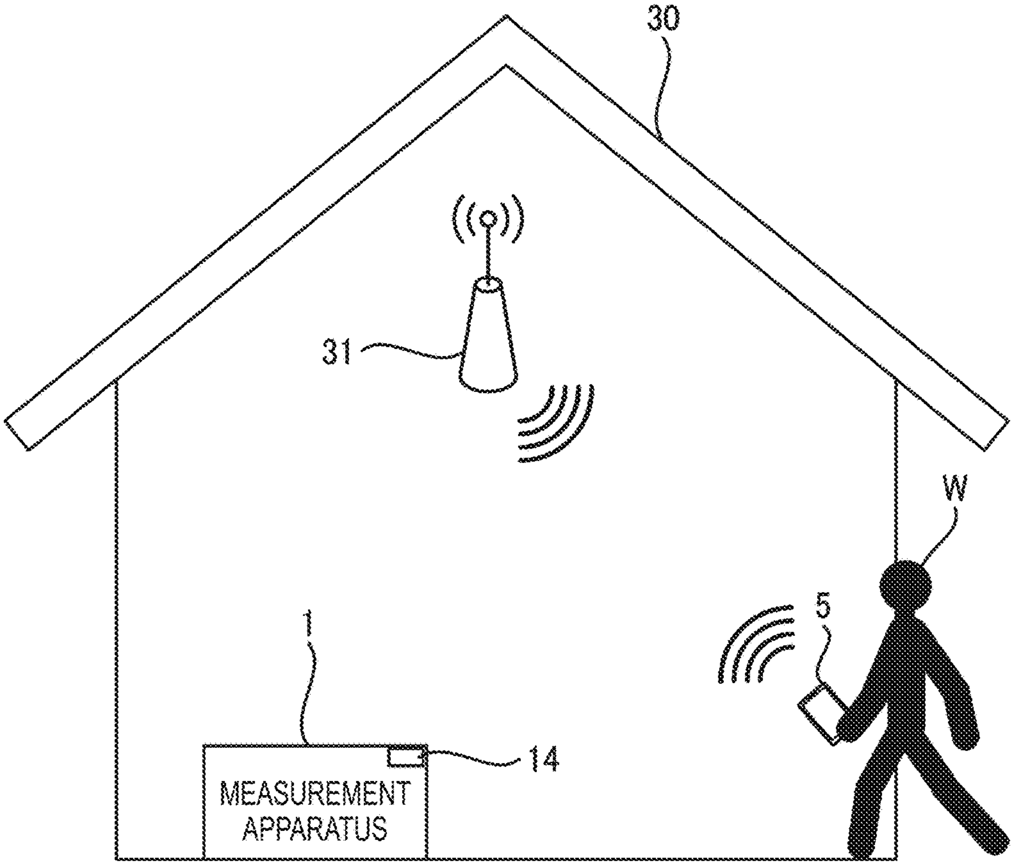
FIG. 8 is a diagram showing an example of measuring the radio field intensity of wireless communication and detecting approach of the user.

FIG. 8 is a diagram showing an example in which the BLE circuit of the wireless communication unit 14 mounted on the measurement apparatus 1 detects the approach of the user W by measuring the radio field intensity of Wi-Fi communication executed between the access point 31 of the wireless LAN in a home 30 of the user W and the information terminal 5 carried by the user W. When the user W carrying the information terminal 5 returns home, the access point 31 of the home 30 and the information terminal 5 of the user W automatically start the Wi-Fi communication. For example, the BLE circuit of the wireless communication unit 14 periodically monitors a change in the received radio field intensity of the 2.4 GHz frequency (main Ch of Wi-Fi), and determines that the user W carrying the information terminal 5 returns (approaches) home when the start of the Wi-Fi communication at the access point 31 is detected or when a high radio field intensity of a predetermined period of the 2.4 GHz frequency at the access point 31 is observed.

In step S12, when the approach of the user to the measurement apparatus 1 is not detected (step S12: No), the controller 18 returns to step S11 and repeats the processing. When the approach of the user to the measurement apparatus 1 is detected (step S12: Yes), the controller 18 controls the wireless communication unit 14 to start the transmission of the advertisement signal (step S13).

Next, the controller 18 determines whether a connection request to the measurement apparatus 1 has been received after the transmission of the advertisement signal (step S14). When the connection request has not been received (step S14: No), the controller 18 determines whether a certain period of time set as time for receiving the connection request has elapsed (step S15).

In step S15, when the certain period of time has not elapsed (step S15: No), the controller 18 returns to step S14 and repeats the processing. When the certain period of time has elapsed (step S15: Yes), that is, when there is no connection request from the external device within the certain period of time, the controller 18 controls the wireless communication unit 14 to stop the transmission of the advertisement signal (step S16). After stopping the transmission of the advertisement signal, the controller 18 returns to step S11 and repeats the processing. That is, even when the controller 18 detects the approach of the user and starts the transmission of the advertisement signal, if there is no connection request from the external device within the certain period of time, the controller 18 stops the transmission of the advertisement signal and returns to the processing of sensing the movement of the user by the sensor 15.

On the other hand, in step S14, when the connection request is received (step S14: Yes), the controller 18 stops the transmission of the advertisement signal, and starts communication via the BLE connection with the external device having the connection request (step S17). The external device that makes a connection request is a device that has received the advertisement signal from the measurement apparatus 1, and may be, for example, a plurality of external devices around the measurement apparatus 1 that are devices capable of BLE communication with the measurement apparatus 1, including the information terminal 5 of the user W.

For example, when the measurement apparatus 1 receives the connection request from the information terminal 5 of the user W and is BLE connected to the information terminal 5 of the user W, the measurement apparatus 1 after the BLE connection operates as follows. In the state in which the measurement apparatus 1 is BLE connected to the information terminal 5 of the user W, for example, when the power button of the measurement apparatus 1 is pressed, the measurement apparatus 1 cancels the sleep state. Then, when the measurement button of the measurement apparatus 1 is further pressed, the measurement apparatus 1 measures, for example, the biological information of the user W using the measurement unit 13. The measurement apparatus 1 transmits the measured biological information as the management measurement information of the user W to the information terminal 5 of the user W by the BLE communication.

In the processing procedure shown in FIG. 6, an example has been described in which the transmission of the advertisement signal is started when the approach of the user is detected. Alternatively, for example, the measurement apparatus 1 may transmit the advertisement signal based on a predetermined condition even when the approach of the user is not detected. Specifically, when the power button of the measurement apparatus 1 is pressed, when the biological information of the user is measured by the measurement unit 13, or when the communication button provided in the measurement apparatus 1 is pressed for a long time (for example, pressed for 2 seconds), the processing may proceed to the processing in step S13 described above, the transmission of the advertisement signal may be started, and the subsequent processing may be executed.

As described above, when the sensor 15 detects a change in the surrounding environment, the measurement apparatus 1 causes the controller 18 to transmit the advertisement signal for the wireless communication (the BLE communication) to the wireless communication unit 14. Accordingly, when a change in the surrounding environment is detected, it is possible to transmit the advertisement signal for starting the BLE communication. Therefore, since it is possible to transmit the advertisement signal without requiring a specific operation performed by the user, the convenience is improved. Since the transmission of the advertisement signal is started, for example, it is possible to smoothly transfer the measurement information after measuring the biological information or the like. Further, when there is no change in the surrounding environment, the advertisement signal is not transmitted, and the sensor 15 only needs to detect the surrounding environment. Therefore, the power consumption may be reduced.

For example, the controller 18 of the measurement apparatus 1 transmits the advertisement signal when the approach of the user is detected based on a change in the surrounding environment. Therefore, since the advertisement signal may be transmitted when the user approaches the measurement apparatus 1, the measurement information may be smoothly transferred after the biological information or the like is measured by the user in the measurement apparatus 1. Since the advertisement signal is not transmitted when the user does not approach the measurement apparatus 1, the power consumption may be reduced.

According to the measurement apparatus 1, even when the measurement apparatus 1 is not in use (for example, during sleep), the sensor 15 may detect a change in the surrounding environment. Therefore, when the controller 18 detects the approach of the user based on the change in the surrounding environment, the measurement apparatus 1 may transmit the advertisement signal before the user starts using (measuring) the measurement apparatus 1.

According to the measurement apparatus 1, it is possible to transmit the advertisement signal based on a change in the relative positional relationship between the user and the measurement apparatus 1 accompanying the movement of the user. The user is the owner of the measurement apparatus 1 and the information terminal 5. Accordingly, the advertisement signal is transmitted when the user approaches the measurement apparatus 1, and the advertisement signal is not transmitted when the user does not approach the measurement apparatus 1. Therefore, the power consumption may be reduced.

According to the measurement apparatus 1, for example, when the acceleration sensor detects surrounding vibration or the like due to the approach of the user, or when the human sensor detects the approach of the user, the advertisement signal may be transmitted. Therefore, when there is no change in the surrounding environment, the advertisement signal is not transmitted, and the acceleration sensor or the human sensor only needs to detect the surrounding environment. Therefore, the power consumption may be reduced.

According to the measurement apparatus 1, it is possible to detect the approach of the user by measuring the radio field intensity of the Wi-Fi communication between the access point 31 and the information terminal 5 using the BLE circuit, and to transmit the advertisement signal. Therefore, when there is no change in the radio field intensity of the Wi-Fi communication, the advertisement signal is not transmitted, and the BLE circuit only needs to execute the detection. Therefore, the power consumption may be reduced.

§ 4 Modification

Although the embodiments of the present disclosure have been described in detail above, the above description is merely an example of the present disclosure in all respects. Various improvements and modifications may be made without departing from the scope of the present disclosure. For example, the following changes are possible. In the following description, the same components as those of the above embodiment are denoted by the same reference signs, and the description thereof is omitted as appropriate. The following modifications may be appropriately combined.

<Measurement Executed by Blood Pressure Monitor>

Figure 9:
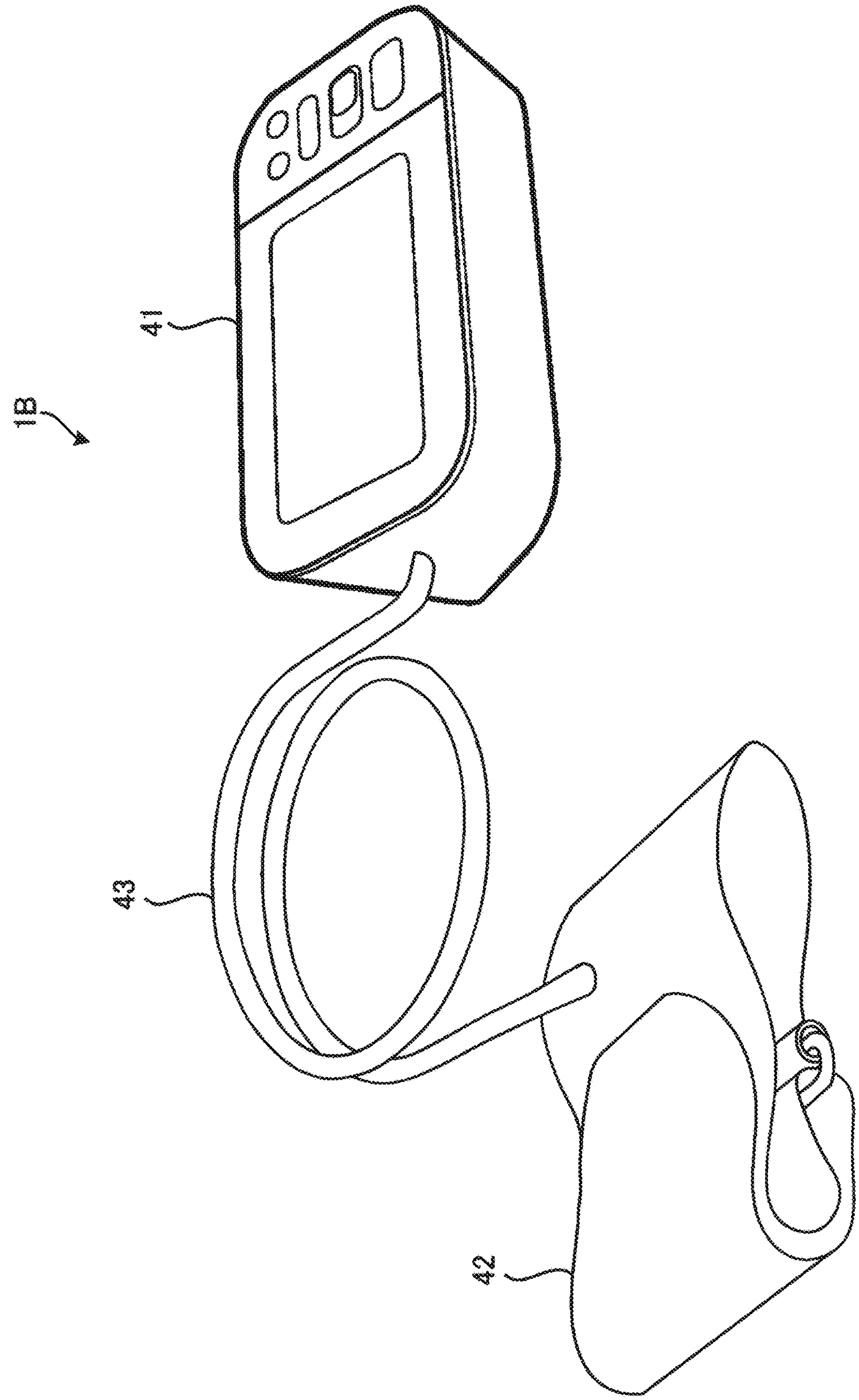
FIG. 9 is a diagram showing a blood pressure monitor as an example of the measurement apparatus.

The measurement apparatus according to the embodiment of the present disclosure may be a blood pressure monitor. FIG. 9 is a diagram showing a blood pressure monitor 1B as an example of the measurement apparatus. The blood pressure monitor 1B measures the blood pressure of the user, outputs the measurement result to the user, and transmits the measurement result as the management measurement information of the user to the information terminal 5 by wireless communication. For example, the blood pressure monitor 1B includes a body portion 41, a cuff 42 that may be wrapped around the upper arm of the user, and an air tube 43 that connects the body portion 41 and the cuff 42. In the example in FIG. 9, the cuff 42 and the body portion 41 are separate bodies. Alternatively, the cuff 42 may be integrated with the body portion 41. In the case in which the blood pressure value, the pulse rate, and the heart rate of the user are measured by the blood pressure monitor 1B, similarly to the case described in the above embodiment, it is possible to improve the convenience, to smoothly transfer the measurement information, and to reduce the power consumption.

§ 5 Program

The method for controlling the measurement apparatus 1 described in the above embodiment may be achieved by executing a control program prepared in advance on a computer. The control program is stored in a computer-readable storage medium and is executed by being read from the storage medium. The control program may be provided in a form stored in a non-transitory storage medium such as a flash memory, or may be provided via a network such as the Internet. The computer that executes the control program may be provided in the control apparatus, may be provided in an electronic device such as a smartphone, a tablet terminal, or a personal computer that may communicate with the control apparatus, or may be provided in a server device that may communicate with the control apparatus and the electronic device.

The present disclosure includes following configurations.

(1) A non-wearable measurement apparatus including:

a wireless communication interface configured to execute wireless communication with an information terminal;

a sensor configured to detect a change in a surrounding environment; and a controller configured to cause the wireless communication interface to transmit an advertisement signal for the wireless communication in response to the sensor detecting the change in the surrounding environment.

According to (1), it is possible to transmit the advertisement signal for starting the wireless communication when the sensor detects the change in the surrounding environment. Therefore, since the operation performed by the user is not required, the convenience is improved. For example, it is possible to smoothly transfer data after using the measurement apparatus. Further, when there is no change in the surrounding environment, the advertisement signal is not transmitted (for example, only the detection by the sensor is executed), so that the power consumption may be reduced.

(2) The measurement apparatus according to (1), in which the controller causes the wireless communication interface to transmit the advertisement signal in response to approach of a user being detected based on the change in the surrounding environment.

According to (2), the advertisement signal may be transmitted when the user approaches the measurement apparatus. Therefore, it is possible to smoothly transfer data after using the measurement apparatus. The advertisement signal is not transmitted when the user does not approach the measurement apparatus, so that the power consumption may be reduced.

(3) The measurement apparatus according to (1) or (2), in which the sensor detects the change in the surrounding environment when the measurement apparatus is not in use, and in which, in response to the sensor detecting the change in the surrounding environment, the controller causes the wireless communication interface to transmit the advertisement signal before use of the measurement apparatus.

According to (3), even when the measurement apparatus is not in use, the approach of the user may be detected based on the change in the surrounding environment. Since the approach of the user may be detected when the measurement apparatus is not in use, the advertisement signal may be transmitted before the measurement apparatus starts to be used by the approaching user.

(4) The measurement apparatus according to any one of (1) to (3), in which the change in the surrounding environment is a change related to movement of a user.

According to (4), it is possible to transmit the advertisement signal when the change in the surrounding environment related to the movement of the user is detected.

(5) The measurement apparatus according to any one of (1) to (4), in which the sensor includes an acceleration sensor.

According to (5), for example, the advertisement signal may be transmitted when the acceleration sensor detects surrounding vibration or the like due to the approach of the user.

(6) The measurement apparatus according to any one of (1) to (5), in which the sensor includes a human sensor.

According to (6), for example, when the approach of the user is detected by the human sensor, the advertisement signal may be transmitted.

(7) The measurement apparatus according to any one of (1) to (6), in which the sensor includes a sensor configured to measure a radio field intensity in wireless communication different from the wireless communication.

According to (7), for example, the approach of the user may be detected by a change in the radio field intensity in the wireless communication, and the advertisement signal may be transmitted at that time.

(8) A non-transitory computer-readable storage medium storing a control program for a non-wearable measurement apparatus including a wireless communication interface configured to execute wireless communication with an information terminal and a sensor configured to detect a change in a surrounding environment, the control program causing a processor of the measurement apparatus to execute a process comprising:

causing the wireless communication interface to transmit an advertisement signal for the wireless communication in response to the sensor detecting the change in the surrounding environment.

According to (8), it is possible to transmit the advertisement signal for starting the wireless communication when the sensor detects the change in the surrounding environment. Therefore, since the operation performed by the user is not required, the convenience is improved. For example, it is possible to smoothly transfer data after using the measurement apparatus. Further, when there is no change in the surrounding environment, the advertisement signal is not transmitted (for example, only the detection by the sensor is executed), so that the power consumption may be reduced.

According to the present disclosure, it is possible to provide a measurement apparatus and a storage medium storing a control program thereof that are capable of improving user convenience and reducing power consumption.

Although various embodiments have been described above, it goes without saying that the present invention is not limited to these examples. It is apparent to those skilled in the art that various changes or modifications may be conceived within the scope described in the claims, and it is understood that the changes or modifications naturally fall within the technical scope of the present invention. In addition, the components described in the above embodiment may be freely combined without departing from the spirit of the invention.

What is claimed is:

1. A non-wearable measurement apparatus comprising:

a wireless communication interface configured to execute wireless communication with an information terminal;

a sensor configured to detect a change in a surrounding environment when the measurement apparatus is not in use; and a controller configured to, in response to the sensor detecting the change in the surrounding environment, cause the wireless communication interface to transmit an advertising signal for establishing the wireless communication with the information terminal before use of the measurement apparatus.

2. The measurement apparatus according to claim 1, wherein the controller causes the wireless communication interface to transmit the advertising signal in response to approach of a user being detected based on the change in the surrounding environment.

3. The measurement apparatus according to claim 1, wherein the change in the surrounding environment is a change related to movement of a user.

4. The measurement apparatus according to claim 1, wherein the sensor includes an acceleration sensor.

5. The measurement apparatus according to claim 1, wherein the sensor includes a human sensor.

6. The measurement apparatus according to claim 1, wherein the sensor includes a sensor configured to measure a radio field intensity in wireless communication different from the wireless communication.

7. A non-transitory computer-readable storage medium storing a control program for a non-wearable measurement apparatus including a wireless communication interface configured to execute wireless communication with an information terminal and a sensor configured to detect a change in a surrounding environment when the measurement apparatus is not in use, the control program causing a processor of the measurement apparatus to execute a process comprising:

causing, in response to the sensor detecting the change in the surrounding environment, the wireless communication interface to transmit an advertising signal for establishing the wireless communication with the information terminal before use of the measurement apparatus.

8. The measurement apparatus according to claim 1, wherein the measurement apparatus is a biological information measurement apparatus that measures biological information.

9. The measurement apparatus according to claim 8, wherein the controller is configured to cause the wireless communication interface to transmit the advertising signal and establish the wireless communication with the information terminal before the biological information is measured.

* * * * *